United States Patent [19]
Manuel

[11] Patent Number: 5,398,795
[45] Date of Patent: Mar. 21, 1995

[54] CLUTCH ARM ROCKER PIN ON REMOVABLE SUPPORT

[76] Inventor: Wendell Manuel, Rte. 6, Box 54, Ada, Okla. 74820

[21] Appl. No.: 48,535

[22] Filed: Apr. 14, 1993

[51] Int. Cl.⁶ .................. F16D 25/08; F16D 13/58; B23P 6/00
[52] U.S. Cl. .................. 192/85 C; 29/402.08; 192/91 R; 192/99 S; 192/115
[58] Field of Search .................. 192/99 S, 115, 91 R, 192/85 C; 29/402.08

[56] References Cited

U.S. PATENT DOCUMENTS

| | | |
|---|---|---|
| 1,985,014 | 12/1934 | Bush . |
| 2,708,497 | 5/1955 | Parrett .................. 192/99 S X |
| 3,009,554 | 11/1961 | Frank .................. 192/99 S |
| 3,099,340 | 7/1963 | Camp . |
| 3,207,142 | 9/1965 | Gorissen et al. . |
| 3,213,991 | 10/1965 | Smirl et al. . |
| 3,220,524 | 11/1965 | Puidokas .................. 192/99 S |
| 3,250,356 | 5/1966 | Zeidler .................. 192/99 S X |
| 3,250,357 | 5/1966 | Zeidler .................. 192/99 S X |
| 3,261,438 | 7/1966 | Binder . |
| 3,277,987 | 10/1966 | Zeidler .................. 192/99 S X |
| 4,428,471 | 1/1984 | Parker et al. . |
| 4,464,953 | 8/1984 | Tar . |
| 4,655,335 | 4/1987 | Maruyamano et al. .......... 192/99 S |
| 4,860,870 | 8/1989 | Romig .................. 192/99 S |
| 5,004,086 | 4/1991 | Petzold et al. .................. 192/91 R X |

FOREIGN PATENT DOCUMENTS 2308668 8/1974 Germany .................. 192/99 S

*Primary Examiner*—Rodney H. Bonck
*Attorney, Agent, or Firm*—Mary M. Lee

[57] ABSTRACT

A rocker pin attached to a removable support member for a clutch assembly which includes a clutch arm. The plate is removably attached behind the point in the clutch housing where the rocker pin is positioned. A conventional clutch housing can be modified in accordance with the present invention by cutting a window in that portion of the wall of the clutch housing which supports the rocker pin and attaching a support member over the window. Clutch housings and vehicles may be manufactured originally in accordance with the invention by providing a clutch housing wherein the rocker pin is supported by a removable member which mounts to the clutch housing.

29 Claims, 5 Drawing Sheets

CLUTCH ARM ROCKER PIN ON REMOVABLE SUPPORT

FIELD OF THE INVENTION

The present invention relates generally to clutch assemblies and, more particularly, to rocker pins which support the clutch arm of such assemblies.

SUMMARY OF THE INVENTION

The present invention is directed to a clutch housing assembly for the drive mechanism of an automotive vehicle, wherein the drive mechanism comprises a clutch apparatus adapted to be supported inside a clutch housing, a transmission supported inside a transmission case and a pivotally mounted clutch arm extending between the clutch apparatus and a slave cylinder outside the clutch housing, by which clutch arm the drive mechanism is engaged and disengaged in response to movement of the slave cylinder, and wherein the transmission case has a mounting flange extending therefrom, the mounting flange having bolt holes therein for attaching the transmission case to a clutch housing by bolts extending therethrough.

The clutch housing assembly comprises a clutch housing adapted to house the clutch apparatus. The clutch housing includes a transmission mounting plate with bolt holes therein, and the bolt holes are aligned with the bolt holes in the mounting flange of the transmission case. The clutch housing defines a first window through which the clutch arm extends. Also included in the assembly is a support member having bolt holes therein aligned with the bolt holes in the transmission mounting plate and the mounting flange on the transmission case. A rocker pin is supported on the support member. The shape of the support member and the position of the bolt holes therein permit the support member to be connected to the drive mechanism by bolts which extend through the bolt holes in the support member and through the transmission bolt holes in the transmission case and the clutch housing and so that in the assembled drive mechanism the rocker pin supports the clutch arm for pivotation during operation of the clutch apparatus.

The present invention further is directed to a clutch assembly for the drive mechanism of an automotive vehicle, wherein the drive mechanism comprises a transmission supported inside a transmission case, wherein the transmission is adapted to operate with a clutch apparatus supported inside a clutch housing and a slave cylinder, wherein the transmission case has a mounting flange extending therefrom, the mounting flange having bolt holes therein for receiving bolts extending therethrough. The clutch assembly comprises a clutch apparatus adapted to operate with the transmission, and a clutch housing for housing the clutch apparatus. The clutch housing has a transmission mounting plate thereon with bolt holes aligned with the bolt holes in the mounting flange of the transmission case. The wall of the clutch housing defines a first window. A clutch arm extends through the first window of the clutch housing between the slave cylinder of the drive mechanism and the clutch apparatus.

Also included is a support member with bolt holes aligned with the bolt holes in the mounting flange of the transmission case and the bolt holes in the transmission mounting plate of the clutch housing. A rocker pin is supported on the support member and positioned thereon to pivotally support the clutch arm for pivotation during operation of the clutch apparatus, whereby the clutch arm engages and disengages the drive mechanism in response to movement of the slave cylinder.

Still further, the present invention is directed to an automotive vehicle comprising a transmission case including a mounting flange with bolt holes therein and a transmission supported inside the transmission case. A clutch housing is provided, and the clutch housing has a first window and a transmission mounting plate with bolt holes therein aligned with the bolt holes in the transmission case mounting flange. A clutch apparatus is supported inside the clutch housing and is operatively connected to the transmission. A slave cylinder is included outside the clutch housing, and a clutch arm extends through the first window of the clutch housing and between the clutch apparatus and the slave cylinder. There also is a support member with bolt holes therein aligned with the bolt holes in the mounting flange of the transmission case and the bolt holes in the transmission mounting plate of the clutch housing. A rocker pin is attached to the support member and is positioned thereon to pivotally support the clutch arm for pivotation during operation of the clutch apparatus. In this way, the clutch arm engages and disengages the drive mechanism in response to movement of the slave cylinder. Finally, bolts extend through the bolt holes on the transmission case mounting flange, the bolt holes on the transmission mounting plate of the clutch housing and the bolt holes in the support member whereby the support member is removably attached to the drive mechanism.

Further still, the present invention comprises a rocker pin replacement kit for an automotive vehicle having a drive mechanism which includes a transmission supported inside a transmission case, a clutch apparatus supported inside a clutch housing, the clutch apparatus being operatively connected to the transmission, the clutch housing having a first window in the wall thereof, a slave cylinder, a clutch arm extending through the first window and between the slave cylinder and the clutch apparatus in the clutch housing, the transmission case having a mounting flange extending therefrom, the mounting flange having bolt holes, and the clutch housing having a transmission mounting plate thereon with bolt holes therein aligned with the bolt holes in the transmission case mounting flange. The rocker pin replacement kit comprises a rocker pin having a stem with a head on one end. A support member is attached to the end of the stem opposite the head, and the support member has bolt holes therein aligned with the bolt holes in the clutch housing transmission mounting plate and the bolt holes in the transmission case mounting flange. Also included are bolts sized to extend through the bolt holes on the support member, the bolt holes in the transmission mounting flange and the bolt holes in the clutch housing transmission mounting plate. Thus, the support member is removably connectable to the drive mechanism so that the rocker pin is positioned to pivotally support the clutch arm so that the clutch apparatus is engaged and disengaged in response to movement of the slave cylinder.

Further still, the present invention includes a method for repairing a clutch housing in an automotive vehicle having a drive mechanism including a transmission supported inside a transmission case, a clutch apparatus supported inside a clutch housing, the clutch apparatus being operatively connected to the transmission, the clutch housing having a first window in the wall thereof, the drive mechanism further comprising a slave cylinder, a clutch arm extending through the first window of the clutch housing and between the slave cylinder and the clutch apparatus in the clutch housing, wherein the clutch arm is pivotally supported by a rocker pin mounted on the inside wall of the clutch housing near the window, the transmission case having a mounting flange extending therefrom, the mounting flange having bolt holes therein, and the clutch housing having a transmission mounting plate thereon with bolt holes therein aligned with the bolt holes in the transmission case mounting flange, wherein the clutch housing wall has been damaged near the rocker pin.

In accordance with this method, the original rocker pin first is removed, as is the clutch arm and a portion of the clutch housing wall surrounding the original rocker pin thereby forming a second window in the wall of the clutch housing. A replacement rocker pin support member comprising a rocker pin supported on a support member is selected. The rocker pin is sized to support the clutch arm, and the support member has bolt holes therein aligned with the bolt holes in the transmission case mounting flange. The clutch arm is replaced and the replacement rocker pin support member is positioned over the second window whereby the rocker pin is held in the position of the original rocker pin. The replacement rocker pin support member then is connected to the drive mechanism by attaching bolts through the bolt holes in the transmission case mounting flange, the bolt holes in the clutch housing mounting plate and the bolt holes in the replacement rocker pin support member.

DETAILED DESCRIPTION OF THE PREFERRED EMBODIMENTS

In certain conventional vehicular clutch mechanisms, the clutch lever or arm pivots on a stud or rocker pin which is set in the inside wall of a bell-shaped clutch housing. When it is necessary to change or repair such a clutch assembly, extreme pressure must be placed on the rocker pin in order to disassemble the clutch system. This pressure often causes cracking or tearing of the wall of the clutch housing at the point where the rocker pin is set. When such damage occurs, replacement of the entire housing is required. Replacement procedure is both dangerous and time consuming and the cost of a replacement housing is substantial.

The present invention eliminates this common and costly problem. In accordance with this invention, a conventional clutch housing may be modified simply and inexpensively by removing the original rocker pin along with a portion of the wall of the housing where the rocker pin is set. Then, a removable rocker pin support member to which a rocker pin is affixed is mounted over the opening so that the rocker pin is supported in the original position. A rocker pin replacement kit with accompanying support member, mounting plate and bolts may be marketed for this purpose.

It will be appreciated that the present invention also may be applied in the original manufacture of vehicles. Or, replacement clutch housings sold in the aftermarket may be equipped with the removable rocker pin and support assembly of this invention.

Clutch assemblies which incorporate the removable rocker pin and support assembly of the present invention are advantageous in several ways. Because the rocker pin support is removably mounted to the housing, subsequent repairs of the clutch mechanism are simplified. The clutch mechanism can be accessed by simply removing the rocker pin support. There is no need to bleed the hydraulic system or to disconnect the master cylinder. This is safer and less time consuming that the procedures currently required to disassemble and reinstall conventional clutch systems.

Figure 1:
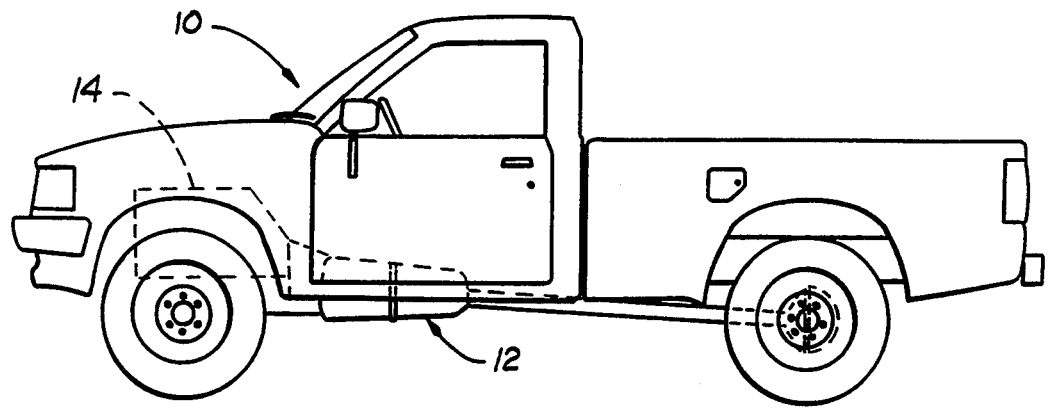
FIG. 1 is a diagrammatic illustration of a pickup truck which includes a drive mechanism comprising a clutch assembly and clutch housing.

With reference now to the drawings in general and to FIG. 1 in particular, there is shown therein a pickup truck designated generally by reference numeral 10. Shown in simplified, diagrammatic form is a drive mechanism 12 which includes a clutch apparatus (not shown in FIG. 1) contained within a clutch housing 14.

Figure 2:
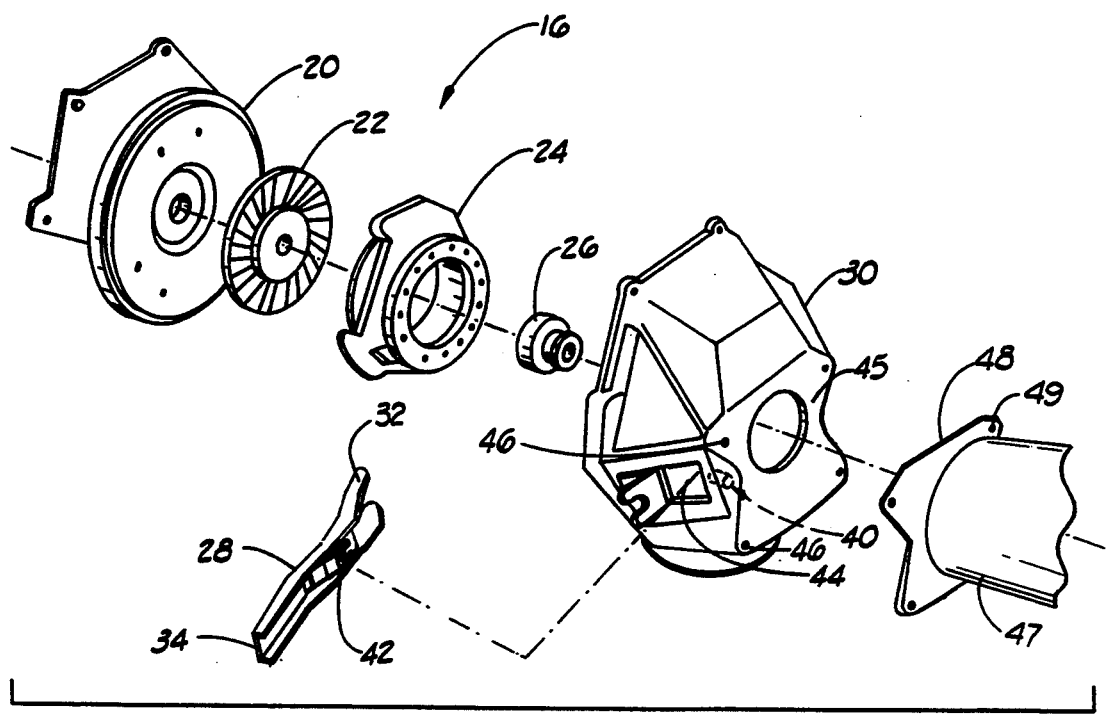
FIG. 2 is an exploded view of a conventional clutch assembly.

An exemplary prior art clutch assembly 16 is represented in exploded form in FIG. 2. The clutch assembly 16 includes a flywheel 20, a clutch disk 22, a clutch pressure plate and cover assembly 24, a clutch hub and bearing assembly 26, a clutch release lever or arm 28 and clutch housing 30. The clutch arm 28 has a forked end 32 which engages the clutch hub and bearing assembly 26. The other end 34 of the clutch arm 28 connects to the slave cylinder (not shown in FIG. 2). The clutch arm 28 pivots over a rocker pin or stud 40 (shown in phantom) and is equipped with a forked member 42 for engaging the rocker pin 40. The clutch arm 28 accesses the clutch hub and bearing assembly 26 through a window 44 in the side of the clutch housing 30. The rear end of the clutch housing 30 comprises a transmission mounting plate 45 with bolt holes 46 for receiving transmission bolts (not shown in this Figure).

The transmission case 47 extends from a transmission mounting flange 48 having bolt holes 49 which are aligned with bolt holes 46 in the transmission mounting plate 45. Thus, as the piston of the slave cylinder moves in and out, the clutch arm 28 engages and disengages the clutch assembly 16.

Figure 3:
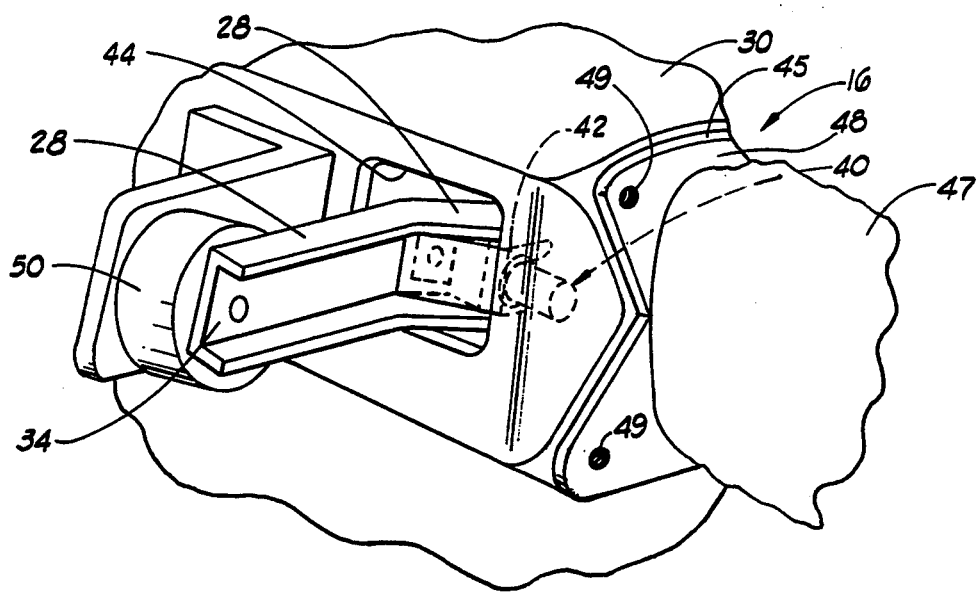
FIG. 3 is an enlarged, fragmented view of the conventional clutch assembly of FIG. 2 showing the clutch arm and rocker pin mounted inside the clutch housing.

Turning now to FIG. 3, the conventional clutch assembly 16 is shown in assembled form. The drawing is enlarged to show the installation of the clutch arm 28 through the window 44. The end 34 of the clutch arm 28 is attached to the slave cylinder 50. The forked member 42 on the clutch arm 28 engages the rocker pin 40 (shown in phantom), which is set in the inside wall of the clutch housing 30 adjacent the window 44.

Figure 4:
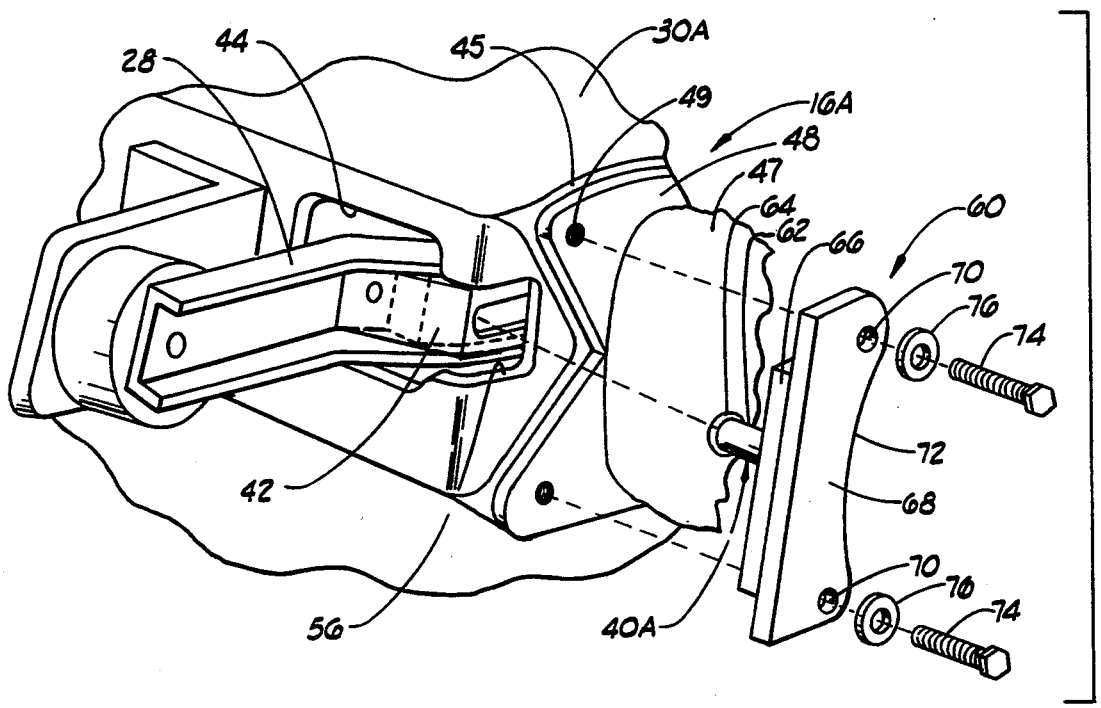
FIG. 4 is an enlarged, fragmented and exploded view of a clutch assembly comprising a rocker pin support member and mounting plate in accordance with one embodiment of the present invention.

Attention now is directed to FIG. 4 which depicts a clutch assembly 16A modified in accordance with the present invention. The rocker pin and a portion of the clutch housing wall immediately around it (see FIG. 2) have been removed to form a window 56 which preferably is continuous with the clutch arm window 44.

Figure 5:
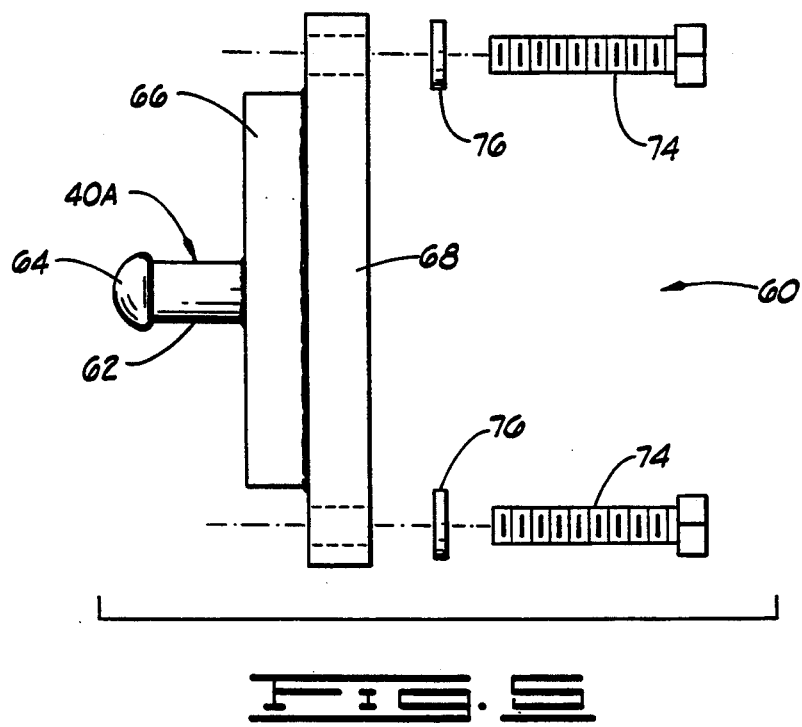
FIG. 5 is a side elevational view of the rocker pin support member and mounting plate shown in FIG. 4.
Figures 6, 7:
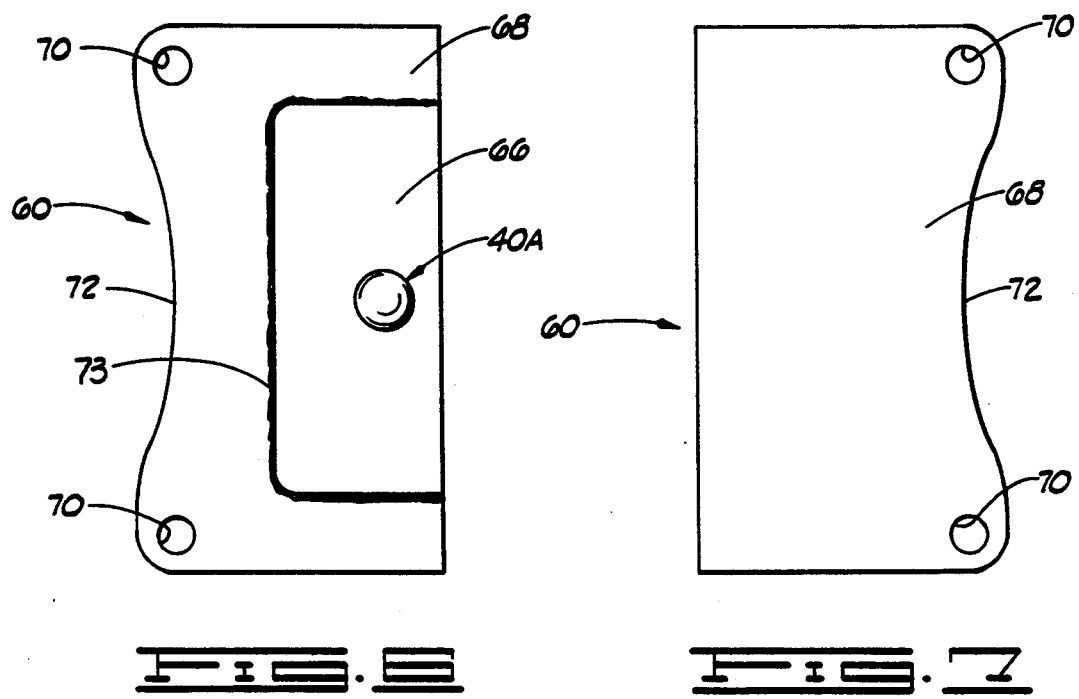
FIG. 6 is a front elevational view of the rocker pin support member and mounting plate shown in FIG. 5.
FIG. 7 is a rear elevational view of the rocker pin support member and mounting plate shown in FIG. 5.

Referring also to FIGS. 5 through 7, the modified clutch assembly 16A includes a rocker pin support assembly 60. The rocker pin support assembly 60 includes a rocker pin 40A which may be the conventional "mushroom" shape having a stem 62 and a blunt rounded head 64. The base (not seen in FIG. 4) is attached to a support member, such as the flat rectangular support plate 66 which is sized to fit over the window 56 so that the rocker pin 40A will be supported in the position of the original pin (see FIG. 3).

In the preferred practice of the invention, the support plate 66 is attached to the clutch housing 30A by using the original transmission bolt holes 46 and 49. To this end, the support plate 66 is affixed to a mounting plate 68 with bolt holes 70 positioned to align with the transmission bolt holes 46. The support plate 66 is about the same thickness as the transmission mounting plate 45 and the mounting flange 48 combined, so that the inner surface of the mounting plate 68 will mate with the surface of the mounting flange 48. The edge 72 of the mounting plate 68 adjacent the transmission case 47 when the assembly 60 is installed is contoured to fit around the transmission case. As best seen in FIG. 6, the support plate 66 is sized smaller than the mounting plate 68 so that the inner edge 73 of the support plate will fit outside the mounting flange 48 and mounting plate 46.

To accommodate the increased thickness of the mounting plate 68, the rocker pin support assembly 60 is provided with replacement bolts 74 which are long enough to attach the transmission mounting flange 48 as well as the mounting plate 68. Washers 76 may be included.

In most cases the rocker pin, the support plate and the mounting plate all will be formed of steel. For example, the support plate and the mounting plate may both be cut from one-half inch steel plate and simply welded together. The rocker pin may be welded or press fitted.

Figure 8:
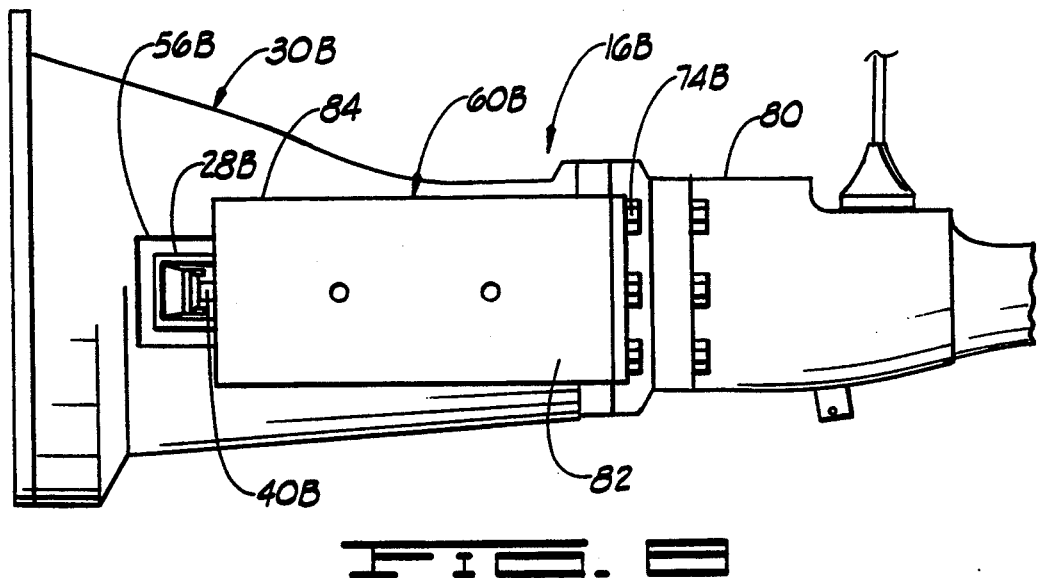
FIG. 8 is a side elevational view of another conventional clutch and transmission housing modified in accordance with another embodiment of the present invention.
Figure 9:
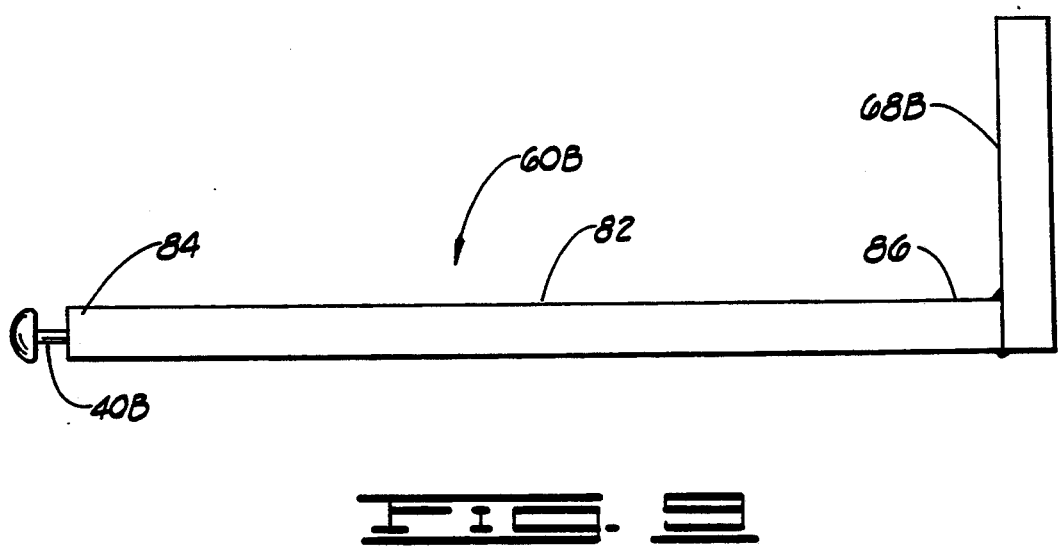
FIG. 9 is plan view of the rocker pin support member and mounting plate of the embodiment shown in FIG. 8.
Figure 10:
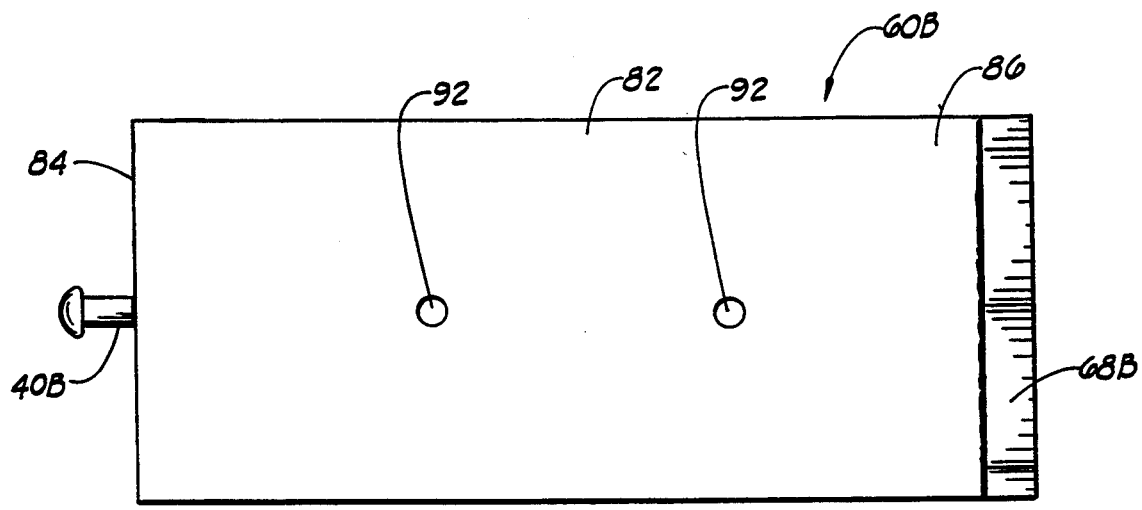
FIG. 10 is an inside elevational view of the rocker pin support member and mounting plate of the embodiment shown in FIG. 8.
Figures 11, 12:
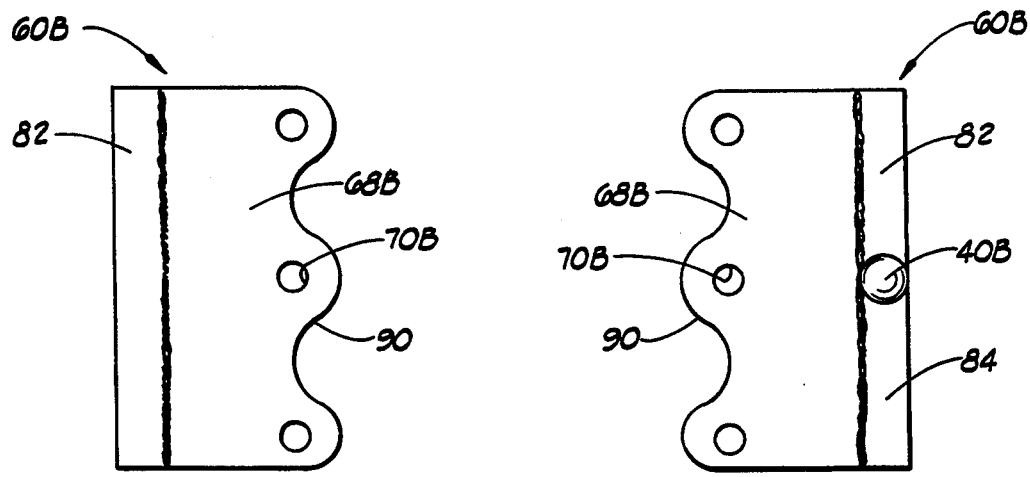
FIG. 11 is a rear elevational view of the rocker pin support member and mounting plate of the embodiment shown in FIG. 8.
FIG. 12 is a front elevational view of the rocker pin support member and mounting plate of the embodiment shown in FIG. 8.

Another typical clutch assembly 16B is illustrated in FIG. 8. In this assembly, the clutch housing 30B is elongated so that the transmission case 80 is mounted further rearward of the clutch arm window 56B. The rocker pin support assembly 60B is modified accordingly. Thus, the support member for the rocker pin 40B takes the form of a support bar 82 which is sized to reach from the window 56B back to the level of the transmission case 80. Referring now also to FIGS. 9-12, the rocker pin 40B extends from the end 84 of the support bar 82, and the opposite end 86 of the support bar 82 is attached to a mounting plate 68B. The mounting plate 68B is provided with bolt holes 70B (FIGS. 11 and 12) which align with the bolt holes for the transmission case 80, and extended bolts 74B (FIG. 8) are included to attach the mounting plate 68B to the clutch housing 30B. The edge 90 (FIGS. 11 and 12) of the mounting plate 68B which is adjacent the transmission case 80 is contoured to conform to the shape of the transmission case.

As in the embodiment of FIGS. 4 through 7, the rocker pin, support bar and mounting plate preferably are formed of steel plate. However, because of the length of the support bar, five-eighths inch steel plate is preferable. For additional support, bolt holes 92 (FIGS. 8 and 10) may be provided in the support bar 82 and corresponding bolt holes drilled in the adjacent wall of the clutch housing 30B for attachment of the support bar directly to the clutch housing.

Now it will be understood that the present invention may be modified to accommodate clutch assemblies of various configurations which are not shown or described herein. The rocker pin support assembly itself is simple and inexpensive to manufacture. Modification of existing clutch housings is equally simple. The steel rocker pin support member which supports the rocker pin is much stronger than the thin aluminum wall of most clutch housings. Thus, the rocker pin support assembly eliminates the risk of destroying the clutch housing wall during clutch repair procedures.

The repair procedures involved in disassembling and reinstalling clutch mechanisms are greatly simplified to require only one person in most instances, as compared with conventional procedures which usually require two persons. In addition, the danger usually associated with prying the clutch arm to engage the clutch after bleeding the pressure from the slave cylinder is also eliminated. Thus, the removable rocker pin support assembly of this invention improves safety and decreases cost of clutch repair and maintenance and increases the life of the clutch housing.

Changes may be made in the combination and arrangement of the various parts, elements, steps and procedures described herein without departing from the spirit and scope of the invention as defined in the following claims.

What is claimed is:

1. A clutch housing assembly for the drive mechanism of an automotive vehicle, wherein the drive mechanism comprises a clutch apparatus adapted to be supported inside a clutch housing, a transmission supported inside a transmission case and a pivotally mounted clutch arm extending between the clutch apparatus and a slave cylinder outside the clutch housing, by which clutch arm the drive mechanism is engaged and disengaged in response to movement of the slave cylinder, wherein the transmission case has a mounting flange extending therefrom, the mounting flange having bolt holes therein for attaching the transmission case to a clutch housing by bolts extending therethrough, the assembly comprising:

a clutch housing adapted to house the clutch apparatus, the clutch housing including a transmission mounting plate with bolt holes therein, the bolt holes being aligned with the bolt holes in the mounting flange of the transmission case;

wherein the clutch housing defines a first window through which the clutch arm extends;

a support member having bolt holes therein aligned with the bolt holes in the transmission mounting plate and the mounting flange on the transmission case; and a rocker pin supported on the support member; and wherein the shape of the support member and the position of the bolt holes therein permit the support member to be connected to the drive mechanism by bolts which extend through the bolt holes in the support member and through the transmission bolt holes in the transmission case and the clutch housing and so that in the assembled drive mechanism the rocker pin supports the clutch arm for pivotation during operation of the clutch apparatus.

2. The clutch housing assembly of claim 1 wherein the rocker pin is rigidly attached to the support member.

3. The clutch housing assembly of claim 1, wherein the wall of the clutch housing defines a second window and wherein the support member is attached to the clutch housing over the second window in the wall of the clutch housing so that the rocker pin-extends inside the clutch housing through the window.

4. The clutch housing assembly of claim 3 wherein the first window in the clutch housing is continuous with the second window.

5. The clutch housing assembly of claim 4 wherein the bolt holes in the clutch housing are adjacent the first window and wherein the rocker pin support member is a plate sized to fit over the second window and wherein the clutch housing assembly further comprises bolt means for attaching the support member to the drive mechanism.

6. The clutch housing assembly of claim 4 wherein the bolt holes in the clutch housing are spaced a distance rearward on the clutch housing from the first window, wherein the rocker pin support member comprises a plate having an edge on which the rocker pin is supported and a body which extends back to a point adjacent the bolt holes in the clutch housing, and wherein the support member comprises bolt means for attaching the body of the support member to the drive mechanism by the bolt holes in the clutch housing and bolt holes in the mounting flange on the transmission case.

7. The clutch housing assembly of claim 1 wherein the support member is adapted to be attached outside the clutch housing over the mounting flange of the transmission case.

8. A clutch assembly for the drive mechanism of an automotive vehicle, wherein the drive mechanism comprises a transmission supported inside a transmission case, wherein the transmission is adapted to operate with a clutch apparatus supported inside a clutch housing, wherein the drive mechanism of the automotive vehicle includes slave cylinder for engaging and disengaging the clutch apparatus, wherein the transmission case has a mounting flange extending therefrom, the mounting flange having bolt holes therein for receiving bolts extending therethrough, the assembly comprising:
a clutch apparatus adapted to operate with the transmission;
a clutch housing for housing the clutch apparatus, the clutch housing having a transmission mounting plate thereon with bolt holes aligned with the bolt holes in the mounting flange of the transmission case, and wherein the wall of the clutch housing defines a first window;

a clutch arm extending through the first window of the clutch housing between the slave cylinder of the drive mechanism of the automotive vehicle and the clutch apparatus;

a support member having bolt holes therein aligned with the bolt holes in the mounting flange of the transmission case and the bolt holes in the transmission mounting plate of the clutch housing; and a rocker pin supported on the support member and positioned thereon to pivotally support the clutch arm for pivotation during operation of the clutch apparatus, whereby the clutch arm engages and disengages the drive mechanism in response to movement of the slave cylinder.

9. The clutch assembly of claim 8 further comprising attachment bolts and wherein the support member is attached to the clutch housing by the attachment bolts extending through the bolt holes in the mounting plate on the clutch housing and the bolt holes in the mounting flange on the transmission case.

10. The clutch assembly of claim 8 wherein the rocker pin is rigidly attached to the support member.

11. The clutch assembly of claim 8 wherein the wall of the clutch housing defines a second window, wherein the support member is attached to the drive mechanism over the second window.

12. The clutch assembly of claim 11 wherein the first window in the clutch housing is continuous with the second window.

13. The clutch assembly of claim 12 wherein the bolt holes in the clutch housing transmission mounting plate are adjacent the first window and wherein the support member is a plate sized to fit over a portion of the first window and wherein the clutch assembly further comprises bolts for attaching the plate to the drive mechanism by the bolt holes in the mounting flange of the transmission case and the bolt holes in the clutch housing transmission mounting plate.

14. The clutch assembly of claim 12 wherein the transmission mounting plate on the clutch housing is spaced a distance rearward on the clutch housing from the first window, wherein the support member comprises a plate having an edge on which the rocker pin is attached and a body which extends back to a point adjacent the bolt holes, and wherein the clutch assembly further comprises bolts sized to extend through the bolt holes on the support member, the bolt holes in the transmission case mounting flange and the bolt holes in the clutch housing transmission mounting plate.

15. The clutch assembly of claim 8 wherein the support member is adapted to be attached outside the clutch housing over the mounting flange of the transmission case.

16. An automotive vehicle comprising:
a transmission case including a mounting flange with bolt holes therein;
a transmission supported inside the transmission case;
a clutch housing with a first window and with a transmission mounting plate having bolt holes therein aligned with the bolt holes in the transmission case mounting flange;
a clutch apparatus supported inside the clutch housing and operatively connected to the transmission;
a slave cylinder outside the clutch housing;
a clutch arm extending through the first window of the clutch housing and between the clutch apparatus and the slave cylinder;

a support member having bolt holes therein aligned with the bolt holes in the mounting flange of the transmission case and the bolt holes in the transmission mounting plate of the clutch housing;

a rocker pin attached to the support member positioned to pivotally support the clutch arm for pivotation during operation of the clutch apparatus, whereby the clutch arm engages and disengages the drive mechanism in response to movement of the slave cylinder;

bolts extending through the bolt holes on the transmission case mounting flange, the bolt holes on the transmission mounting plate of the clutch housing and the bolt holes in the support member whereby the support member is removably attached to the drive mechanism.

17. The automotive vehicle of claim 16 wherein the rocker pin is rigidly attached to the support member.

18. The automotive vehicle of claim 16 wherein the clutch housing has a second window, wherein the support member is attached to the clutch housing over the second window in the wall of the clutch housing so that the rocker pin extends inside the clutch housing through the second window.

19. The automotive vehicle of claim 18 wherein the second window through which the rocker pin extends inside the clutch housing is continuous with the first window.

20. The automotive vehicle of claim 19 wherein the bolt holes in the clutch housing mounting transmission plate are adjacent the first window and wherein the support member is a plate sized to fit over the second window.

21. The automotive vehicle of claim 19 wherein the clutch housing mounting transmission plate is spaced a distance rearward on the clutch housing from the first window and wherein the support member comprises a plate having an edge on which the rocker pin is supported and a body which extends back to a point adjacent the bolt holes.

22. The automotive vehicle of claim 16 wherein the support member is adapted to be attached outside the clutch housing over the mounting flange of the transmission case.

23. A rocker pin replacement kit for an automotive vehicle having a drive mechanism including a transmission supported inside a transmission case, a clutch apparatus supported inside a clutch housing, the clutch apparatus being operatively connected to the transmission, the clutch housing having a first window in the wall thereof, a slave cylinder, a clutch arm extending through the first window and between the slave cylinder and the clutch apparatus in the clutch housing, the transmission case having a mounting flange extending therefrom, the mounting flange having bolt holes, and the clutch housing having a transmission mounting plate thereon with bolt holes therein aligned with the bolt holes in the transmission case mounting flange, the rocker pin replacement kit comprising:

a rocker pin comprising a stem with a head on one end;

a support member attached to the end of the stem opposite the head, the support member including bolt holes therein adapted to be aligned with the bolt holes in the clutch housing transmission mounting plate and the bolt holes in the transmission case mounting flange; and bolts sized to extend through the bolt holes on the support member, the bolt holes in the transmission mounting flange and the bolt holes in the clutch housing transmission mounting plate, whereby the support member is removably connectable to the drive mechanism so that the rocker pin is positioned to pivotally support the clutch arm so that the clutch apparatus is engaged and disengaged in response to movement of the slave cylinder.

24. The rocker pin replacement kit of claim 23 wherein the transmission mounting plate on the clutch housing of the automotive vehicle is defined as being spaced a distance rearward from the first window in the wall of the clutch housing, wherein the support member is a bar with first and second ends, wherein the rocker pin is attached to the first end of the bar and the second end of the bar comprises a support member mounting plate, the bolt holes of the support member being in the support member mounting plate, whereby when the replacement kit is installed the rocker pin supports the clutch arm and the support member mounting plate engages the transmission case mounting flange.

25. The rocker pin replacement kit of claim 23 wherein the support member comprises a support plate having first and second opposing surfaces and a support member mounting plate having first and second surfaces, wherein the rocker pin is attached to the first surface of the support plate, wherein the second surface of the support plate is attached to the first surface of the mounting plate, and wherein the support member bolt holes are positioned in the support member mounting plate so that when the rocker pin replacement kit is installed the rocker pin supports the clutch arm and the support member mounting plate engages the transmission case mounting flange.

26. The rocker pin replacement kit of claim 23 wherein the support member is adapted to be attached outside the clutch housing over the mounting flange of the transmission case.

27. A method for repairing a clutch housing in an automotive vehicle having a drive mechanism including a transmission supported inside a transmission case, a clutch apparatus supported inside a clutch housing, the clutch apparatus being operatively connected to the transmission, the clutch housing having a first window in the wall thereof, the drive mechanism further comprising a slave cylinder, a clutch arm extending through the first window of the clutch housing and between the slave cylinder and the clutch apparatus in the clutch housing, wherein the clutch arm is pivotally supported by a rocker pin mounted on the inside wall of the clutch housing near the window, first the transmission case having a mounting flange extending therefrom, the mounting flange having bolt holes therein, and the clutch housing having a mounting transmission plate thereon with bolt holes therein aligned with the bolt holes in the transmission case mounting flange, wherein the clutch housing wall has been damaged near the rocker pin, the method comprising the steps of:

removing the original rocker pin, the clutch arm and a portion of the clutch housing wall surrounding the original rocker pin thereby forming a second window in the wall of the clutch housing;

selecting a replacement rocker pin support member comprising a rocker pin supported on a support member, the rocker pin sized being to support the clutch arm and the support member having bolt holes therein aligned with the bolt holes in the transmission case mounting flange;

replacing the clutch arm and positioning the replacement rocker pin support member over the second window whereby the rocker pin is held in the position of the original rocker pin; and connecting the replacement rocker pin support member to the drive mechanism by attaching bolts through the bolt holes in the transmission case mounting flange, the bolt holes in the clutch housing mounting transmission plate and the bolt holes in the replacement rocker pin support member.

28. The method of claim 27 wherein the step of forming the second window is further defined as forming the second window continuous with the first window.

29. The method of claim 27 wherein the step of selecting a replacement rocker pin support member is further defined as selecting a rocker pin support member wherein the rocker pin is positioned outside of the clutch housing when the rocker pin support member is installed in the automotive vehicle.

* * * * *

UNITED STATES PATENT AND TRADEMARK OFFICE
CERTIFICATE OF CORRECTION

PATENT NO. : 5,398,795

DATED : March 21, 1995

INVENTOR(S) : Wendell Manuel

It is certified that error appears in the above-identified patent and that said Letters Patent is hereby corrected as shown below:

Column 7, claim 3, line 22, delete the hyphen (-) between the words "pin" and "extends".

Column 7, claim 8, line 56, between the words "includes" and "slave" insert -- a --.

Column 9, claim 20, line 30, insert -- transmission -- before the word "mounting" and delete -- transmission -- after the word "mounting."

Column 9, claim 21, line 35, insert -- transmission -- before the word "mounting" and delete -- transmission -- after the word "mounting."

Column 10, claim 27, line 53, insert -- first -- before the word "window" and delete -- first -- after the word "window."

Column 10, claim 27, line 56, insert -- transmission -- before the word "mounting" and delete -- transmission -- after the word "mounting."

Column 10, claim 27, line 67, insert -- being -- before the word "sized" and delete -- being -- after the word "sized."

Column 12, claim 27, line 1, insert -- transmission -- before the word "mounting" and delete -- transmission -- after the word "mounting."

UNITED STATES PATENT AND TRADEMARK OFFICE
CERTIFICATE OF CORRECTION

PATENT NO. : 5,398,795
DATED : March 21, 1995
INVENTOR(S) : Wendell Manuel

It is certified that error appears in the above-indentified patent and that said Letters Patent is hereby corrected as shown below:

Column 12, claim 27, line 1, insert -- transmission -- before the word "mounting" and delete -- transmission -- after the word "mounting."

Signed and Sealed this

Twelfth Day of September, 1995

Attest:

BRUCE LEHMAN

*Attesting Officer*     *Commissioner of Patents and Trademarks*